United States Patent [19]
Mettner

[11] Patent Number: 5,263,559
[45] Date of Patent: Nov. 23, 1993

[54] DAMPING SYSTEM FOR A SHOCK ABSORBER HAVING A ONE-WAY CHECK VALVE

[75] Inventor: Michael Mettner, Ludwigsbury, Fed. Rep. of Germany

[73] Assignee: Robert Bosch GmbH, Stuttgart, Fed. Rep. of Germany

[21] Appl. No.: 553,520

[22] Filed: Jul. 18, 1990

[30] Foreign Application Priority Data

Sep. 23, 1989 [DE] Fed. Rep. of Germany ....... 3931857

[51] Int. Cl.⁵ .......................... B60G 17/08; F16F 9/46
[52] U.S. Cl. ................................ 188/299; 188/318; 188/319
[58] Field of Search ............... 188/314, 315, 317, 318, 188/319, 320, 299, 280, 269, 274; 280/707, 702, 708; 207/64.26, 64.28, 64.18, 64.27, 64.15, 64.16

[56] References Cited

U.S. PATENT DOCUMENTS

| 2,036,955 | 4/1936 | Padgett | 188/269 |
| 3,466,055 | 9/1969 | Keijzer | 280/708 |
| 3,550,810 | 3/1976 | Unruh et al. | 280/702 |
| 4,779,895 | 10/1988 | Rubel | 280/707 |
| 4,802,561 | 2/1989 | Knecht et al. | 188/318 |
| 4,830,398 | 5/1989 | Williams et al. | 280/707 |
| 4,850,461 | 7/1989 | Rubel | 188/319 |
| 4,924,392 | 5/1990 | Kurosana | 364/424.05 |
| 4,973,854 | 11/1990 | Hummel | 188/314 |

FOREIGN PATENT DOCUMENTS

| 0142947 | 5/1985 | European Pat. Off. . | |
| 0261427 | 3/1988 | European Pat. Off. . | |
| 0304801 | 3/1989 | European Pat. Off. | 188/314 |
| 3837863 | 3/1990 | Fed. Rep. of Germany | 188/315 |
| 0034809 | 2/1987 | Japan | 188/315 |
| 0093637 | 4/1989 | Japan | 188/274 |
| 0115715 | 5/1989 | Japan | 188/315 |
| 1361030 | 12/1987 | U.S.S.R. | 188/319 |
| 2003255 | 3/1979 | United Kingdom . | |
| 2132273 | 7/1984 | United Kingdom | 188/314 |

Primary Examiner—Matthew C. Graham
Attorney, Agent, or Firm—Edwin E. Greigg; Ronald E. Greigg

[57] ABSTRACT

A shock absorber damping system including at least one cylinder including a compensation chamber which is made to communicate with a pressure source. Thus the load-bearing capacity of the shock absorber can additionally be arbitrarily adjusted and varied within wide limits, independently of a damping of the shock absorber.

6 Claims, 1 Drawing Sheet

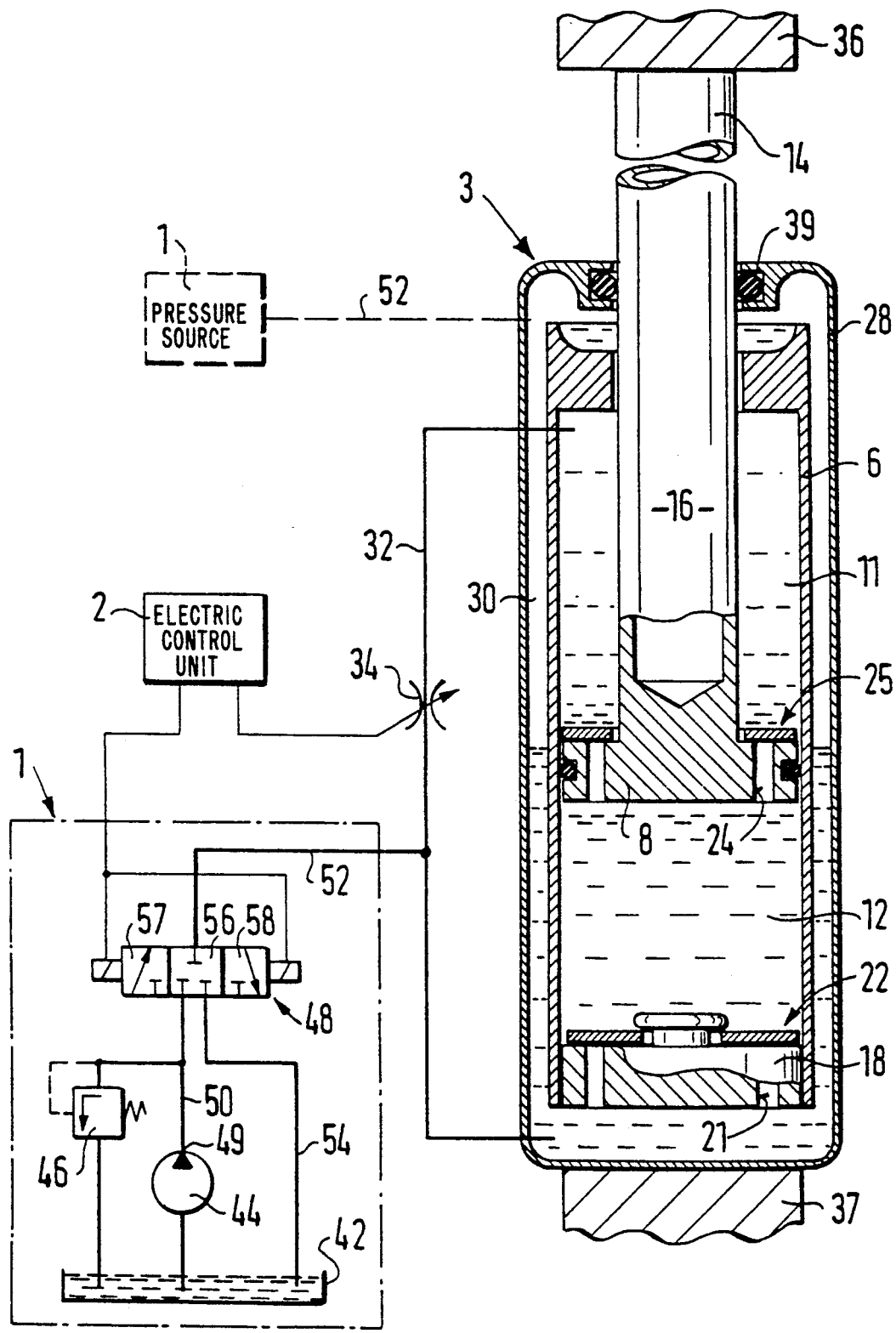

DAMPING SYSTEM FOR A SHOCK ABSORBER HAVING A ONE-WAY CHECK VALVE

BACKGROUND OF THE INVENTION

The invention is based on a damping system for a shock absorber as defined hereinafter.

A known damping system has been set forth by German Patent Document A1 36 32 562. The known damping system has a particularly advantageously embodied double-tube shock absorber. However, the known shock absorber requires a separate bearing spring to support a load. Load changes that occur slowly over a relatively long period of time cannot be intercepted or compensated for by the known shock absorber.

In another known damping system (European Patent Document B1 01 42947 which is the same as U.S. Pat. No. 4,830,398), a first pressure source affects the damping, and a second pressure source serves to support a static load. However, this known damping system is very expensive and requires a great deal of energy to damp motion. A shock absorber required for such a damping system is not structurally simple.

OBJECT AND SUMMARY OF THE INVENTION

The damping system as defined at the outset above has an advantage over the prior art in that an arbitrary load can be supported by the shock absorber with the aid of a pressure source. No separate bearing spring is necessary, or if one is nevertheless used, it can be small.

The invention will be better understood and further objects and advantages thereof will become more apparent from the ensuing detailed description of a preferred embodiment taken in conjunction with the drawing.

BRIEF DESCRIPTION OF THE DRAWING

The single figure of the drawing is a simplified illustration of an exemplary embodiment of a shock absorber according to the invention.

DESCRIPTION OF THE PREFERRED EMBODIMENT

The damping system essentially includes a pressure source 1, an electric control unit 2 and a shock absorber 3.

The shock absorber 3 shown is generally known as a double-tube shock absorber. The shock absorber 3 has an interior chamber embodied in an inner cylinder 6. A damper piston 8 is freely movable in the axial direction inside the cylinder 6 and divides the interior of cylinder 6 into a first work chamber 11 and a second work chamber 12. The first work chamber 11 is located above the damper piston 8 as seen in the drawing, and the second work chamber 12 is located below the damper piston 8. The damper piston 8 is connected to a piston rod 16 shown with one end 14 protruding to the outside. The cylinder 6 has a bottom 18, extending through which is a first connecting conduit 21 that has a check valve 22 opening inward. A second connecting conduit 24 having a check valve 25 extends through the damper piston 8. The check valve 25 permits a flow of pressure fluid out of the second work chamber 12 toward the first work chamber 11.

The cylinder 6 is surrounded by an outer cylinder 28, which includes an outer chamber 30 between the cylinder 6 and the cylinder 28 that is only partly filled with a fluid serving as a pressure fluid; the remainder of the outer chamber 30 is formed by a gas cushion. As only schematically shown, there is a connecting conduit 32 between the first work chamber 11 and a lower point of the outer chamber 30. A throttle restriction 34 is placed in this connecting conduit 32.

The protruding end 14 of the piston rod 16 is connected to a first mass 36, and the other end of the shock absorber 3 is connected to a second mass 37. The first mass 36 is for instance a vehicle body, and the second mass 37 is for instance a wheel support for a vehicle wheel.

Upon a relative motion of the first mass 36 toward the second mass 37, the damper piston 8 makes the second work chamber 12 smaller, with a shortening of spacing (pressure stage), and since the check valve 22 is closed, pressure fluid is positively displaced out of the second work chamber 12 into the first work chamber 11. With only a spring deflection of the shock absorber 3 upwardly, first work chamber 11 increases in size, it is unable to hold the entire amount of pressure fluid, because the piston rod 16 likewise plunges to an increasing extent into the first work chamber 11. The excess pressure fluid is positively displaced into the outer chamber 30 via the connecting conduit 32. In this process the pressure fluid has to flow through the throttle restriction 34, which as the sole throttle restriction 34 in the system is definitive for the throttling of the pressure fluid circulation in the shock absorber 3 in the operating range of the pressure stage.

Upon spring relaxation of the shock absorber 3 (tension stage), that is, upon its lengthening, the cylinder moves downwardly causing the check valve 25 to close and pressure fluid from the first work chamber 11 is positively displaced via the connecting conduit 32 and throttle restriction 34 into the outer chamber 30. Since suction is created in the second work chamber 12, the check valve 22 opens in the first connecting conduit 21 in the bottom 18, and pressure fluid is aspirated from the outer chamber 30 into the work chamber 12. The first connecting conduit 21 having the check valve 22 permits a virtually unthrottled flow of pressure fluid out of the outer chamber 30 into the second work chamber 12.

It can be appreciated that in this way, fluid circulation ensues that is always in the same direction, this has considerable advantages, especially if the pressure fluid is an electrorheological liquid, as set forth in the German patent.

The outer chamber 30 essentially serves as a compensation chamber 30 for the volumetric difference that is created upon extension and retraction of the piston rod 16 out of and into the cylinder 6.

On the face end, the piston rod 16 penetrates the outer cylinder 28. At that point, the compensation chamber 30 is sealed off from the outside by a seal 39.

In the exemplary embodiment shown, the compensation chamber 30 surrounds the cylinder 6, and the first connecting conduit 21 is disposed in the bottom 18 and the second connecting conduit 24 is disposed in the damper piston 8. However, it is also possible to dispose the compensation chamber 30 separately, for instance as an external reservoir outside the cylinder 6, and the connecting conduits 21, 24 can be equally well disposed outside the cylinder 6, on the same condition that the first connecting conduit 21 enables a flow of pressure fluid out of the compensation chamber 30 into the second work chamber 12, and that the second connecting conduit 24 enables a flow out of the second work chamber 12 into the first work chamber 11. The connecting conduits 21, 24 may also, as shown, comprise a plurality of openings.

The pressure source 1 includes a supply container 42, which is at least partly filled with pressure fluid, and a pump 44, a pressure limiting valve 46 and a 3/3-way valve 48. The pump 44 pumps pressure fluid via a pressure connection 49 into a pressure line 50. The pressure limiting valve 46 provides for a constant, arbitrarily selectable pressure in the pressure line 50. The 3/3-way valve 48 has three connections and three switching positions 56, 57, 58. The pressure line 50 is connected to one of the connections. A connecting line 52 is connected to one of the other two connections. The connecting line 52 connects the multi-position valve 48 directly with the compensation chamber 30. The connecting line 52 can use the portion of the connecting conduit 32 between the throttle restriction and the compensation chamber. From the third connection of the multi-position valve 48, a return line 54 leads back to the supply container 42.

The 3/3-way valve 48 is actuatable via electromagnets, as an example, and is electrically connected to the control unit 2. By means of the control unit 2, the multi-position valve 48 can be moved into each of its three switching positions 56, 57, 58. By means of the control unit 2, the throttle restriction 34 in the connecting conduit 32 can also be triggered, however by the control unit 2.

In the first switching position 5 of the multi-position valve 48, all the connections are disconnected from one another. In the second switching position 57, the pressure line 50 communicates with the connecting line 52. In the third switching position 58, the connecting line 52 communicates with the return line 54.

The pressure in the pressure line 50 is at least slightly greater than a maximum required pressure in the compensation chamber 30. With the aid of the second switching position 57 of the multi-position valve 48, the pressure in the compensation chamber 30 can be increased, and with the aid of the third switching position 58, the pressure in the compensation chamber 30 can be decreased. An increase of the pressure in the compensation chamber 30 is also, however, directly propagated into the two work chambers 11, 12, via the connecting conduits 21, 24. Because of the large hydraulically effective surface area of the damper piston 8 on the end toward the second work chamber 12, this results in an increased force upon the piston rod 16 in the extension direction. This leads to an extension of the piston rod 16; in other words, a greater force, i.e., a larger mass 36, can be supported. Lowering of the pressure in the compensation chamber 30 by actuation of the multi-position valve 49 to the third switching position 58 leads to a lowering of the pressure in the two work chambers 11, 12. By this means, a spring deflection of the shock absorber 3 can be brought about, or a spring relaxation of the shock absorber can be prevented upon a lessening of the force or in other words of the mass 36.

The multi-position valve 48 may also be embodied in some other way. For instance, the control valve 48 may be a proportional valve with an arbitrary number of intermediate switching positions. The pump 44 may be embodied as either a constant pump or a pressure-regulated pump. If the pump 44 is a pressure-regulated pump, then the pressure limiting valve 46 may optionally be dispensed with. If the pump 44 is pressure-regulated, then the 3/3-way valve 48 can also optionally be dispensed with, and the lowering or raising of the pressure in the connecting line 52 can be effected directly by triggering the pump 44. A change in pressure by triggering the pressure limiting valve 46 is conceivable as well. A vehicle typically has a plurality of shock absorbers 3. Each shock absorber 3 may have a pressure source 1, or a plurality of shock absorbers 3 can be connected to the pressure source 1.

The pressure source 1 can be embodied such that the pressure in the compensation chamber 30 can be varied only relatively slowly. In this way, leveling of the vehicle body can for instance be achieved. However, the pressure source 1 may also be embodied such that the pressure in the compensation chamber 30 can be varied relatively fast, as a result of which, pitching and rolling of the vehicle body can for instance be additionally damped arbitrarily.

By means of the control unit 2, via the throttle restriction 34, the damping of the shock absorber 3 can be adjusted arbitrarily. Moreover, by means of the control unit 2 via the pressure source 1 and via the pressure in the compensation chamber 30, the suspension action and load-bearing capacity of the shock absorber 3 can be varied arbitrarily within wide limits. A particularly favorable feature of the shock absorber 3 of the damping system according to the invention is that the pressure source 1 that affects the load-bearing capacity has no effect on the damping properties of the shock absorber 3. Because of the variable throttle restriction 34, the shock absorber 3 is a so-called semi-active shock absorber, and by means of the pressure source 1, the force by which the first mass 36 is supported relative to the second mass 37 can furthermore be adjusted arbitrarily and can also, depending on the expenditure, be adjusted arbitrarily quickly.

Only a little energy is necessary for triggering the throttle restriction 34. If the load-bearing capacity of the shock absorber 3 is varied only relatively slowly, for instance for leveling purposes, then only a little energy is necessary for operating the pressure source 1 as well.

In the exemplary embodiment shown, the connecting line 52 leads from the pressure source 1 into the lower, pressure-fluid-filled part of the compensation chamber 30. Here the pressure source 1 furnishes the pressure fluid. However, the pressure source 1 may instead be connected to the shock absorber 3 in such a way that the connecting line 52 leads directly into the upper, gas-filled part of the compensation chamber 30. This variant is indicated in the drawing in dashed lines. In that case, advantageously, the pump 44 of the pressure source 1 pumps a gas, which is exchanged, via the connecting line 52 to the upper portion of the compensation chamber 30, with the gas located there. Some other arbitrarily embodied pressure source required for other purposes in the vehicle already can also be used as the pressure source 1.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the U.S. is:

1. A damping system having a shock absorber including at least one cylinder that is at least partly filled with a pressure fluid and is disposable between two masses of a vehicle, the spacing between which is variable, a damper piston connected to a piston rod, said damper piston divides a first work chamber, penetrated by the piston rod, from a second work chamber in said at least one cylinder, a second connecting conduit, a check valve which monitors said second connecting conduit to enable a flow of pressure fluid out of the second work chamber into the first work chamber; a first connecting conduit, said first connecting conduit is monitored by a second check valve to enable a pressure fluid flow out of a compensation chamber into the second work chamber, and a third connecting conduit which connects said first work chamber with said compensation chamber, said third connecting conduit is monitored by a throttle restriction which restricts a fluid flow of a flow of pressure fluid out of the first work chamber into the compensation chamber, and a pressure source connected to said compensation chamber (30) for varying pressure within said compensation chamber.

2. A damping system as set forth in claim 1, in which said third connecting conduit connects said first work chamber with said compensation chamber and said pressure source is connected to said compensation chamber via said third connecting conduit.

3. A damping system as defined in claim 1, in which said compensation chamber is formed by an outer cylinder which surrounds said at least one cylinder.

4. A damping system as defined by claim 1, in which said pressure source (1) includes a pump (44), a control valve (48) and a supply container (42), wherein the compensation chamber (30) communicates by means of the control valve (48), with a pressure connection (49) of the pump (44) and alternatively with the supply container (42) to control fluid pressure within said compensation chamber.

5. A damping system as set forth in claim 4, in which said throttle restriction is variable.

6. A damping system as set forth in claim 5, which includes an electric control unit (2) that controls said control valve (48) and said variable throttle restriction (34).

* * * * *